US010284314B2

(12) United States Patent
Lunttila et al.

(10) Patent No.: US 10,284,314 B2
(45) Date of Patent: May 7, 2019

(54) MEASUREMENTS IN A WIRELESS SYSTEM

(71) Applicant: Nokia Solutions and Networks Oy, Espoo (FI)

(72) Inventors: Timo Erkki Lunttila, Espoo (FI); Esa Tapani Tiirola, Kempele (FI); Kari Juhani Hooli, Oulu (FI); Rapeepat Ratasuk, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 111 days.

(21) Appl. No.: 14/889,498

(22) PCT Filed: May 9, 2013

(86) PCT No.: PCT/IB2013/053766
§ 371 (c)(1),
(2) Date: Nov. 6, 2015

(87) PCT Pub. No.: WO2014/181154
PCT Pub. Date: Nov. 13, 2014

(65) Prior Publication Data
US 2016/0105248 A1    Apr. 14, 2016

(51) Int. Cl.
H04B 17/24    (2015.01)
H04L 1/00    (2006.01)
(Continued)

(52) U.S. Cl.
CPC ........... *H04B 17/345* (2015.01); *H04B 17/24* (2015.01); *H04L 1/0026* (2013.01); *H04L 5/1469* (2013.01); *H04W 24/08* (2013.01)

(58) Field of Classification Search
None
See application file for complete search history.

(56) References Cited

U.S. PATENT DOCUMENTS 9,781,638 B2 * 10/2017 Davydov ............... H04W 4/70
2010/0067627 A1 * 3/2010 Lincoln .................... H04L 1/20
375/346

(Continued)

FOREIGN PATENT DOCUMENTS

WO    WO 2008/127185 A1    10/2008
WO    2012169817 A2    12/2012

OTHER PUBLICATIONS

3GPP TSG-RAN Meeting #58, Barcelona, Spain, Dec. 4-7, 2012, RP-121772, "Further Enhancements to LTE TDD for DL-UL Interference Management and Traffic Adaptation—Core Part; Performance Part; Feature", CATT, 18 pgs.

(Continued)

*Primary Examiner* — Xavier Szewai Wong
(74) *Attorney, Agent, or Firm* — Harrington & Smith

(57) ABSTRACT

Channel state information is generated by a communication device. The device can determine that at least one uplink resource element of a radio frame is to be left unoccupied and perform at least one interference measurement on at least one downlink resource element coinciding with the at least one unoccupied uplink resource element, A channel state information report can then be generated based on the measurement, A network node may cause the communication device to leave at feast one uplink resource element of a radio frame unoccupied.

22 Claims, 7 Drawing Sheets

Figure 3:
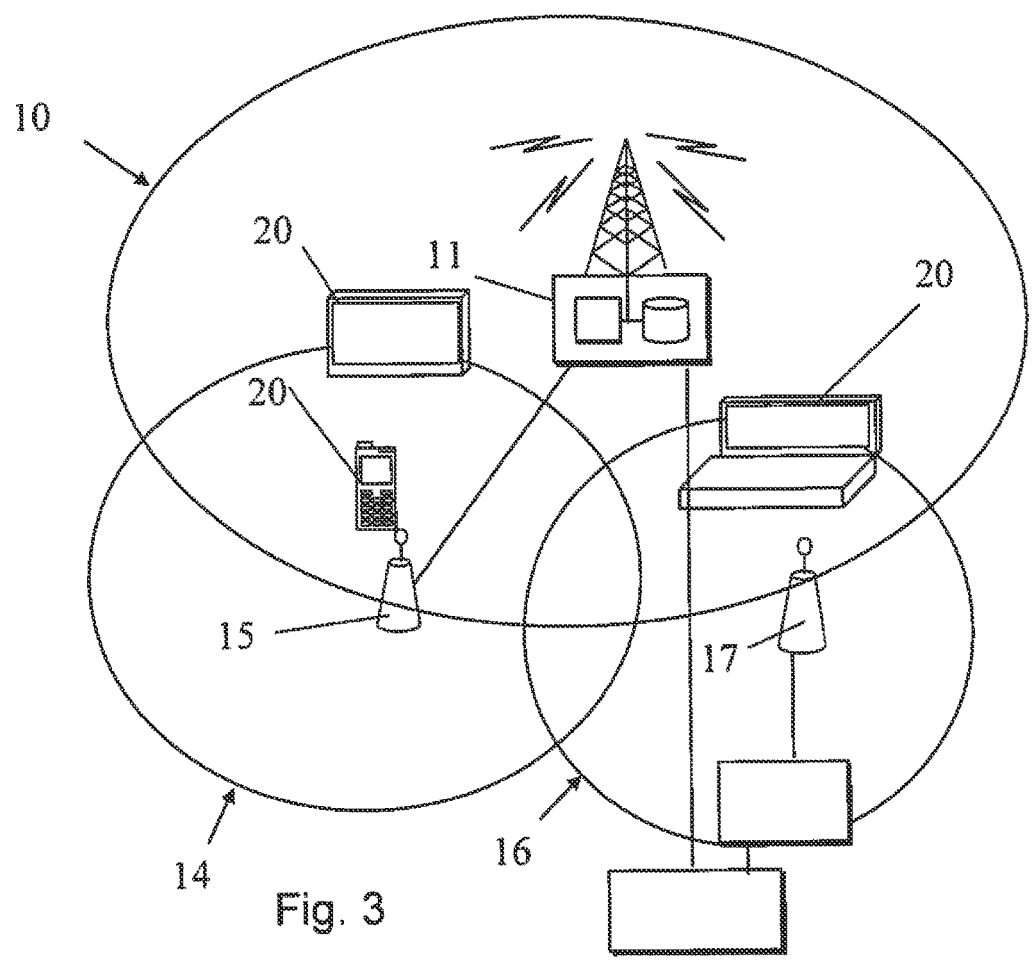

(51) Int. Cl.
*H04W 24/08* (2009.01)
*H04L 5/14* (2006.01)
*H04B 17/345* (2015.01)

(56) References Cited

U.S. PATENT DOCUMENTS

| | | | | |
|---|---|---|---|---|
| 2011/0188466 A1* | 8/2011 | Zhang | ................. | H04J 13/0062 |
| | | | | 370/330 |
| 2012/0002631 A1* | 1/2012 | Nishio | ................... | H04L 5/001 |
| | | | | 370/329 |
| 2012/0300641 A1* | 11/2012 | Chen | ..................... | H04L 1/0026 |
| | | | | 370/241 |
| 2013/0003591 A1* | 1/2013 | Novak | ................. | H04W 36/06 |
| | | | | 370/252 |
| 2013/0072192 A1* | 3/2013 | Xu | ....................... | H04W 16/02 |
| | | | | 455/436 |
| 2014/0092823 A1* | 4/2014 | Song | ........................ | H04L 1/00 |
| | | | | 370/329 |
| 2014/0098720 A1* | 4/2014 | Zeng | ................ | H04W 72/0446 |
| | | | | 370/280 |
| 2015/0188690 A1* | 7/2015 | Khoryaev | ......... | H04W 52/0251 |
| | | | | 370/280 |
| 2015/0223241 A1* | 8/2015 | Cattoni | ................. | H04L 5/0044 |
| | | | | 370/329 |
| 2015/0358142 A1* | 12/2015 | Lee | ....................... | H04L 5/0044 |
| | | | | 370/252 |
| 2016/0050648 A1* | 2/2016 | Seo | ...................... | H04B 7/0626 |
| | | | | 370/329 |

OTHER PUBLICATIONS

3GPP TSG RAN WG1 Meeting #72bis, Chicago, USA, Apr. 15-19, 2013, R1-131063, "DL interference measurement and CSI feedback enhancement in multi-cell scenario", ZTE, 3 pgs.

3GPP TSG RAN WG1 #63, Nov. 15-19, 2010, Jacksonville, USA, R1-105902, "CSI measurements on restricted subframes" 3 pgs.

Samsung: "DL subframe set based mechanism to support TDD UL-DL reconfiguration", 3GPP Draft; R1-131009, 3rd Generation Partnership Project (3GPP), Mobile Competence Centre; 650, Route Des Lucioles; F-06921 Sophia-Antipolis Cedex; France, vol. RAN WG1, No. Chicago, USA; Apr. 5, 2013.

* cited by examiner

Fig. 1

Fig. 2

MEASUREMENTS IN A WIRELESS SYSTEM

This disclosure relates to measurements in a wireless communication system.

A communication system can be seen as a facility that enables communications between two or more nodes such as fixed or mobile communication devices, access points such as base stations, servers, machine type terminals, and so on. A communication system and compatible communicating entities typically operate in accordance with a given standard or specification which sets out what the various entities associated with the system are permitted to do and how that should be achieved. For example, the standards, specifications and related protocols can define the manner how communication devices shall communicate with the access points, how various aspects of the communications shall be implemented and how the equipment shall be configured.

Signals can be carried on wireless carriers. Examples of wireless systems include public land mobile networks (PLMN) such as cellular networks, satellite based communication systems and different wireless local networks, for example wireless local area networks (WLAN). Wireless systems can be divided into coverage areas referred to as cells, and hence the wireless systems are often referred to as cellular systems. A cell can be provided by a base station, there being various different types of base stations and cells.

A user can access the communication system by means of an appropriate communication device or terminal. A communication device is provided with an appropriate signal receiving and transmitting arrangement for enabling communications with other parties. Typically a communication device is used for enabling receiving and transmission of communications such as voice, images, video and other data. A communication device of a user is often referred to as a user equipment (UE).

Communications between an user equipment and a base station can be considered as taking place in two directions, namely the uplink (UL), i.e. from the UE to the base station or in the downlink (DL) i.e. from the base station towards the UE. Time Division Duplexing (TDD) based systems can benefit from flexible resource split between UL and DL. This can be facilitated by means of pre-defined patterns. The UL and DL communications can be configured to follow patterns where certain resources are allocated to UL and other resources to DL communications.

The Uplink-Downlink (UL-DL) configuration has been kept relatively stationary. However, Flexible UL/DL reconfiguration have been proposed for example in work groups defining third Generation Partnership Project (3GPP) Long Term Evolution (LTE) Release 12 standard. This work assumes that the base station, or eNodeB in accordance with LTE specifications, may vary UL-DL configuration relatively often for those UEs configured to flexible configuration compared to a situation where Uplink-Downlink (UL-DL) configuration is in practice stationary.

For easier understating the description of the background in the context of possible 3GPP Release 12 requirements for flexible UL/DL configuration certain non-limiting assumptions are made in here for illustration purposes. Firstly, it is assumed that a predefined cell-specific UL/DL configuration is broadcast in a cell, for example by using System Information Block 1 (SIB-1). Legacy UEs (i.e. those based on LTE Releases 8/9/10/11) in the cell can then follow this configuration all the time. Existing Time Division Duplexing (TDD) UL-DL configurations are used. Thus flexible TDD UL-DL reconfigurations happen among existing configurations. The existing seven configurations for LTE are shown in FIG. 1. TDD UL-DL reconfiguration can occur with (at most) radio frame periodicity for those UEs configured to use flexible UL-DL configuration.

The following discussion also assumes a scenario where in each UL-DL configuration there are fixed subframes where the link direction is always predetermined and thus known. These fixed subframes can be denoted as D (Downlink), S (Special) and U (Uplink). Additionally, there can be flexible subframes. Flexible (F) subframes can be used dynamically as downlink (D) or uplink (U) subframes. The number of flexible subframes may depend on the scenario. This can be determined e.g. by SIB-1 configuration and/or dedicated higher layer signalling.

FIG. 2 illustrates an example for a basic setting where flexible subframes are provided. Here TDD configuration 0 is shown as an example but the same principle applies to other configurations. In the flexible configuration scheme, in addition to a SIB-1 configured UL-DL configuration defining whether a given subframe in the radio frame is downlink, special, or uplink subframe, in flexible TDD UL-DL configurations e.g. some of the uplink subframes can be changed into downlink subframes.

Channel State Information (CSI) reporting is a feature of wireless systems where an UE measures a channel and reports information back to the network. For example, a LTE compatible UE has measured a channel for CSI measurements from the Common Reference Signals (CRS) or CSI-RS and interference from the CRS or CSI interference measurement resource (CSI-IM). A CSI report by a UE can consists of information such as Channel Quality Indicator (CQI), Precoding Matrix Indicator (PMI) and Rank Indicator (RI).

The inventors have recognised that current CSI reporting may not always be best suited for systems where flexible UL/DL subframes are used. A problem in relation to CSI reporting is that the CSI should reflect actual interference conditions at the UE side. The downlink channel conditions as such do not vary significantly among e.g. consecutive DL subframes. However, when used as DL subframes, flexible subframes experience interference which may be fundamentally different from that of fixed DL subframes. A reason for this is that the interference scenario can be different. In flexible subframes, in addition to DL-to-DL interference, also UL-to-DL interference can be present. There may also be less DL-to-DL interference in flexible subframes than in fixed subframes. Depending on the deployment scenario, the interference may originate from the same carrier and/or from adjacent carriers. There can be considerable difference on the average interference level due to differences on the eNB and UE transmission powers as well as on applied power control approaches. Also, UL-to-DL interference has characteristics that are problematic for CSI reporting. UL-to-DL interference level can change rapidly between physical resource blocks (PRBs) as well as between subframes, depending e.g. on Physical Uplink Shared Channel (PUSCH) scheduling decisions, i.e. on selection of UEs that are scheduled, on the pathloss of the scheduled UEs, on the PRB allocations granted to the scheduled UEs and transmit powers of the UEs. Thus the same CSI and especially the same CQI as for fixed DL subframes is not necessarily valid for flexible subframes. This is due to the reason that CQI typically represents the signal-to-interference-plus-noise-ratio (SINR), and a change in the observed interference directly impacts the determined CQI. Thus the same CSI reports cannot be used for both fixed DL and flexible UL/DL subframes but a separate CSI reporting is needed.

A UE cannot properly measure DL channel in the UL subframes as there are no downlink reference signals (Common Reference Signal (CRS) or Channel State Information reference signals (CSI-RS)) present at that time to enable channel estimation. Own cell UL interference can corrupt any interference estimate made. This interference is not present during flexible subframes used for DL in the own cell. When a UE carries out the measurements, the UE may not always know whether the given subframe is used for DL or UL direction. Furthermore, in the case where all flexible subframes of a radio frame are used as UL subframes there is no capability to measure CSI at all during flexible subframes, and thus the radio frame.

It is noted that the above discussed issues are not limited to any particular communication environment and apparatus but may occur in any appropriate system where measurement may be needed.

Embodiments of the invention aim to address one or several of the above issues.

In accordance with an aspect there is provided a method for providing channel state information by a communication device, comprising determining that at least one uplink resource element of a radio frame is to be left unoccupied, performing by the communication device at least one interference measurement on at least one downlink resource element coinciding with the at least one unoccupied uplink resource element, and generating a channel state information report based on the measurement.

In accordance with another aspect there is provided a method for channel state information reporting, comprising causing a communication device to leave at least one uplink resource element of a radio frame unoccupied, and receiving a channel state information report based on at least one interference measurement by the communication device on at least one downlink resource element coinciding with the at least one unoccupied uplink resource element.

In accordance with another aspect there is provided an apparatus for a communication device, the apparatus comprising at least one processor, and at least one memory including computer program code, wherein the at least one memory and the computer program code are configured, with the at least one processor, to cause the communication device to leave at least one uplink resource element of a radio frame unoccupied, perform at least one interference measurement on at least one downlink resource element coinciding with the at least one unoccupied uplink resource element, and generate a channel state information report based on the measurement.

In accordance with another aspect there is provided an apparatus for a network element, the apparatus comprising at least one processor, and at least one memory including computer program code, wherein the at least one memory and the computer program code are configured, with the at least one processor, to cause a communication device to leave at least one uplink resource element of a radio frame unoccupied, and handling of a channel state information report based on at least one interference measurement by the communication device on at least one downlink resource element coinciding with the at least one unoccupied uplink resource.

In accordance with a more detailed aspect the channel state information report is for flexible subframes of the radio frame that can be used dynamically for uplink or downlink transmissions.

In accordance with another more detailed aspect puncturing of a physical uplink shared channel or mapping the physical uplink shared channel around the unoccupied at least one uplink resource element may be provided.

In certain embodiments channel state information is measured from a fixed downlink subframe of the radio frame from a serving enhanced NodeB signal and interference is measured from a flexible subframe.

Aligned downlink and uplink resource elements may be provided for measurement by keeping corresponding downlink and uplink resource elements unoccupied. More unoccupied resource elements may be provided in the uplink than in the downlink. Unoccupied uplink resource elements may be provided continuously over the full bandwidth. Unoccupied uplink resource elements may also be provide only over sections of the bandwidth.

Downlink measurement elements for interference measurements may be determined at least partially based on information of unoccupied uplink resource elements.

Uplink transmissions of the communication device may be scheduled such that uplink transmission do not coincide with configured unoccupied uplink resource elements.

The at least one unoccupied uplink resource element may comprise at least one uplink interference measurement resource element.

In accordance with a more detailed aspect information of tentative measurement resource elements is provided. A type of a subframe subject to a measurement is determined to be a flexible subframe with unknown direction where after the tentative measurement resource elements is considered as at least one uplink interference measurement resource element. At least one interference measurement is then performed on at least one downlink resource element, the element being determined at least partially based on the at least one uplink interference measurement resource element.

In accordance with yet another detailed an aspect information of tentative measurement resource elements is provided and it is determined based thereon that the type of a subframe subject to a measurement is a flexible uplink subframe. It is also determined whether an uplink grant is received for the subframe. If yes, a special channel information determination procedure is performed, and if no, the tentative measurement resource element is considered as at least one interference measurement resource element. In this case at least one interference measurement is performed on at least one downlink resource element that has been determined at least partially based on the at least one uplink interference measurement resource.

A computer program comprising program code means adapted to perform the herein described methods may also be provided. In accordance with further embodiments apparatus and/or computer program product that can be embodied on a computer readable medium for providing at least one of the above methods is provided.

A network node such as a base station node or a controller associated with one or more cells and a communication device such as a mobile station can be configured to operate in accordance with the various embodiments. A communication system embodying the apparatus and principles of the invention may also be provided.

It should be appreciated that any feature of any aspect may be combined with any other feature of any other aspect.

Figure 4:
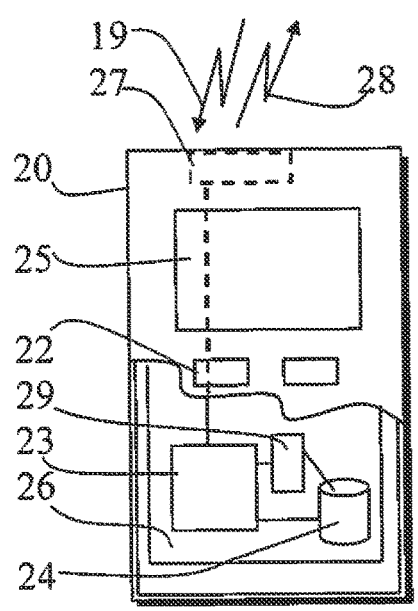
Figure 5:
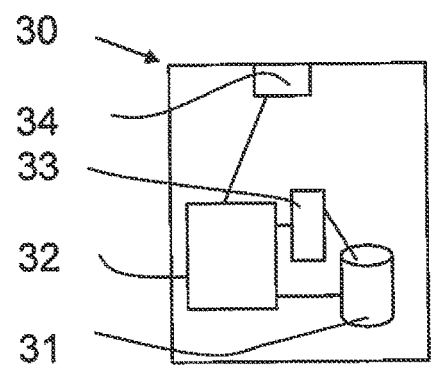
Figure 6:
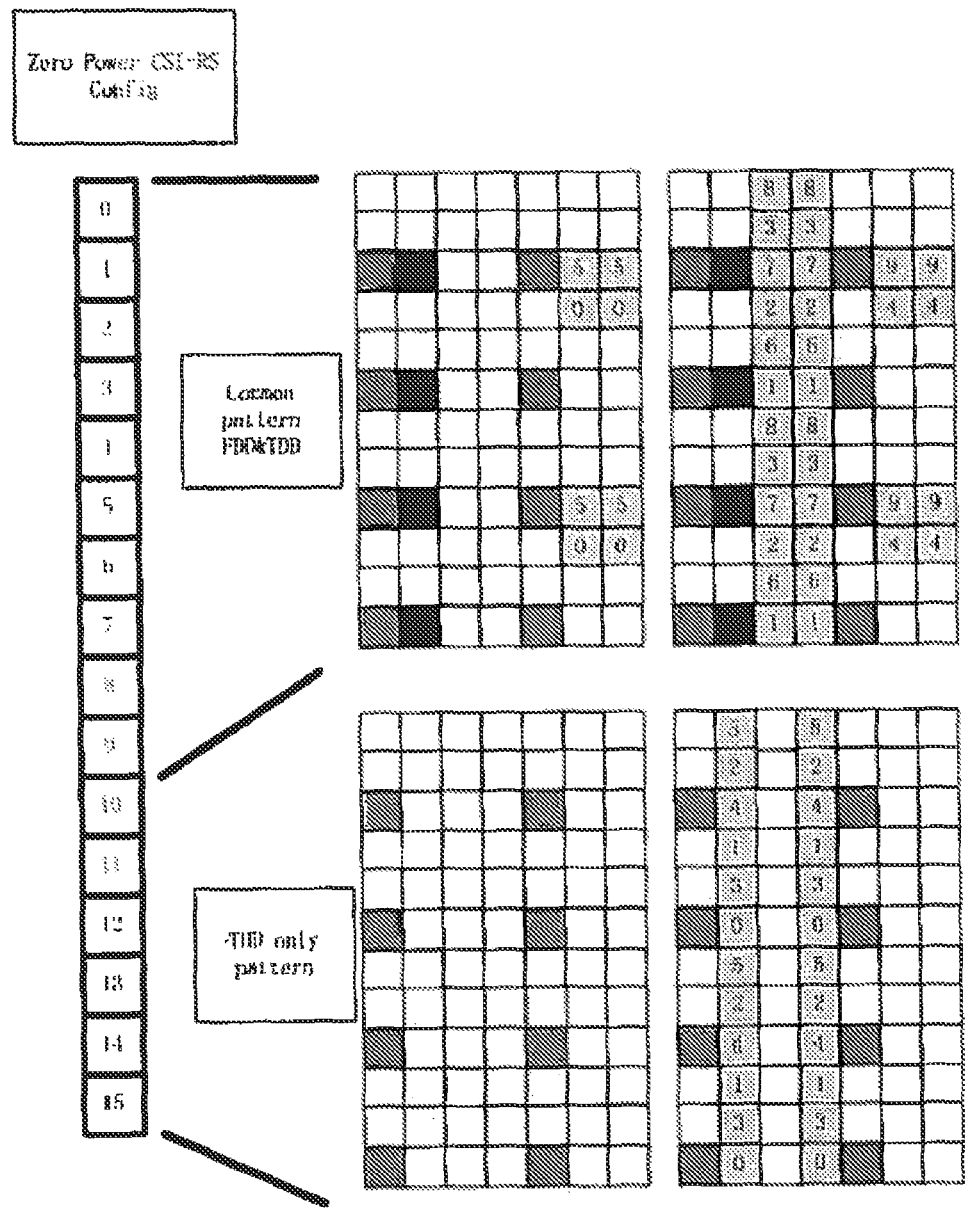
Figure 7:
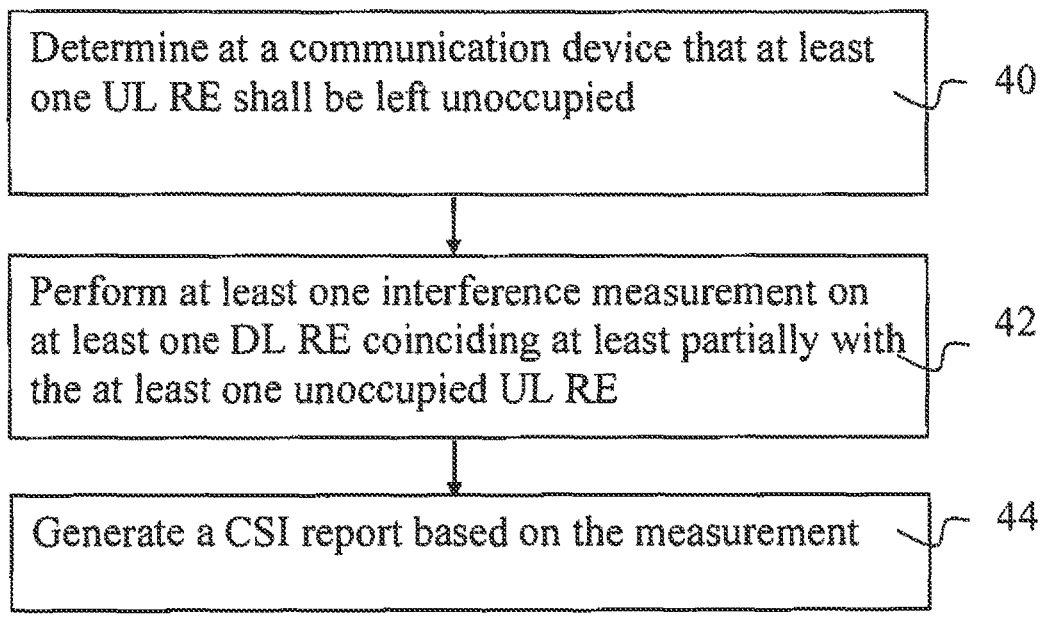
Figure 8:
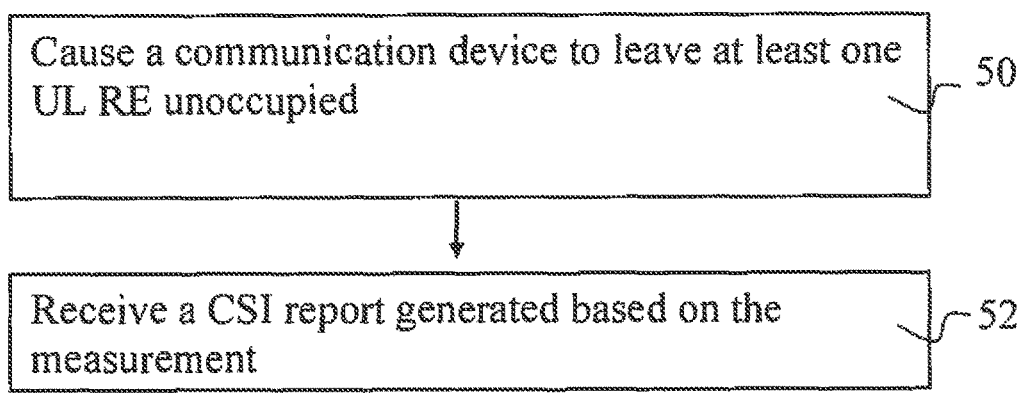
Figure 9:
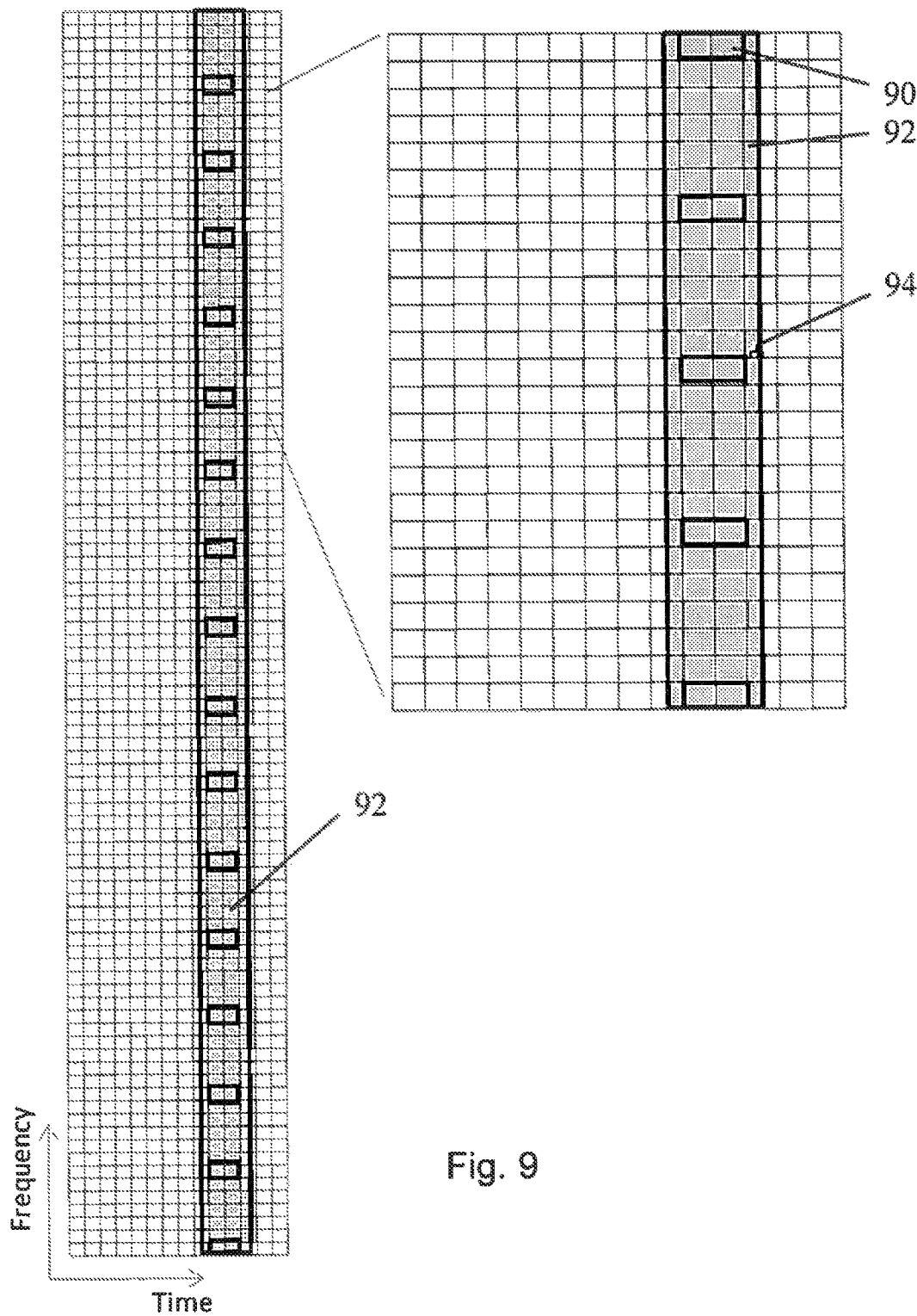
Figure 10:
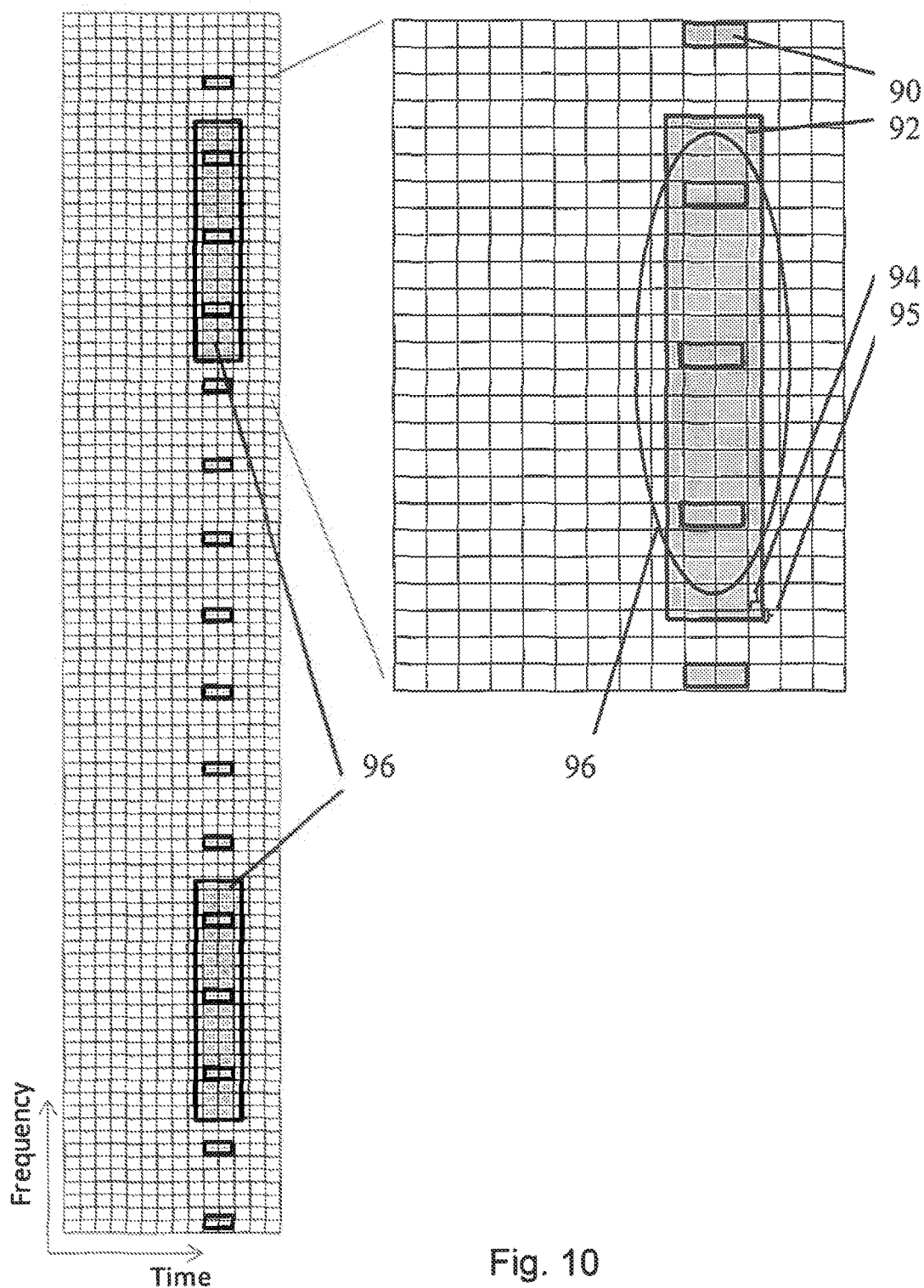
Figure 11:
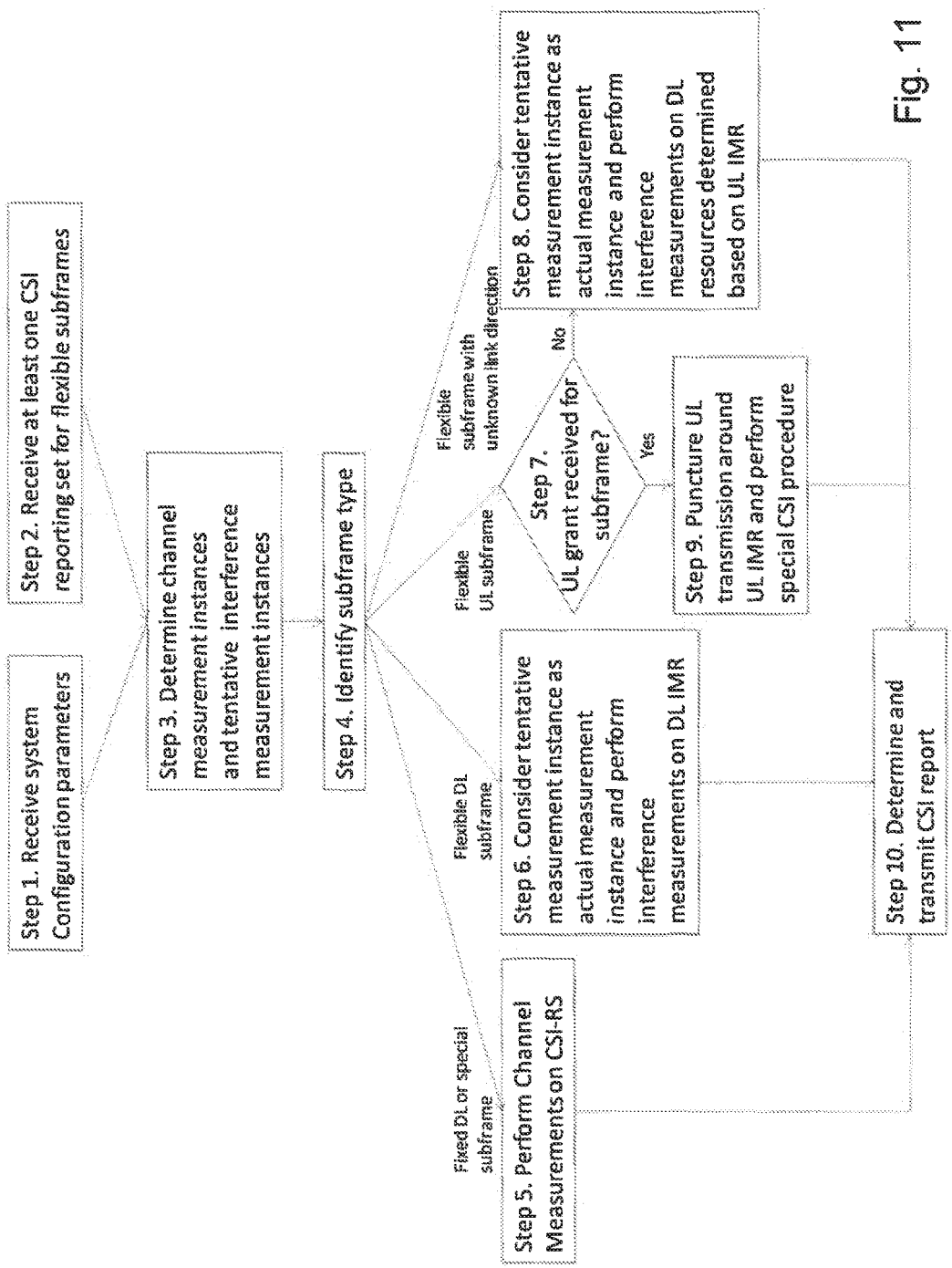

Embodiments will now be described in further detail, by way of example only, with reference to the following examples and accompanying drawings, in which:

FIG. 1 shows an example of possible UL/DL configurations,

FIG. 2 shows a radio frame with possible subframes in accordance with two different modes, FIG. 3 shows a schematic diagram of a cellular system where certain embodiments can be implemented, FIG. 4 shows an example of a communication device, FIG. 5 shows an example of control apparatus for a cell, FIG. 6 shows the principle of CSI interference measurement resources, FIGS. 7 and 8 show flowcharts according to certain embodiments, FIGS. 9 and 10 shows examples for aligning uplink and downlink resources, and FIG. 11 shows a flowchart for operation at the communication device in accordance with an example.

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 3 to 5 to assist in understanding the technology underlying the described examples.

A non-limiting example of the recent developments in cellular communication system architectures is the long-term evolution (LTE) of the Universal Mobile Telecommunications System (UMTS) that is being standardized by the 3rd Generation Partnership Project (3GPP). The recent versions of the standard are often referred to as LTE Advanced (LTE-A). The LTE employs a mobile architecture known as the Evolved Universal Terrestrial Radio Access Network (E-UTRAN). Base stations of LTE and LTE-A systems are known as Node Bs or evolved or enhanced Node Bs (eNodeB; eNB), respectively, and may provide E-UTRAN features such as user plane Radio Link Control/Medium Access Control/Physical layer protocol (RLC/MAC/PHY) and control plane Radio Resource Control (RRC) protocol terminations towards communication devices. A base station such as eNodeB can provide coverage for an entire cell or similar radio service area. Other examples of radio access system include those provided by base stations of systems that are based on technologies such as wireless local area network (WLAN) and/or WiMax (Worldwide Interoperability for Microwave Access). WLANs are sometimes referred to by WiFi™, a trademark that is owned by the Wi-Fi Alliance, a trade association promoting Wireless LAN technology and certifying products conforming to certain standards of interoperability.

Communication devices or terminals 20 can be provided wireless access via base stations or similar wireless transmitter and/or receiver nodes providing radio service areas or cells. In FIG. 3 a plurality of different cells 10, 14 and 16 are shown being provided by base stations 11, 15 and 17, respectively. It is noted that the number of cells and their borders are shown schematically for illustration purposes only in FIG. 3. Thus it shall be appreciated that the number, size and shape of the cells may vary considerably from those shown in FIG. 3. A base station site can provide one or more cells or sectors. A sector may provide a cell or a subarea of a cell.

Base stations are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments the control apparatus may be respectively provided in each base station.

FIG. 4 shows a schematic, partially sectioned view of a communication device 20 that can be employed in the herein described examples. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. A mobile device is typically provided with at least one data processing entity 23, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. Data processing and memory functions provided by the control apparatus of the mobile device to cause control and signalling operations in accordance with certain embodiments of the present invention will be described later in this description.

The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The mobile device may receive and transmit dedicated signals 28 by a base station or another communication device via appropriate apparatus for receiving and transmitting signals. In FIG. 4 the transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

FIG. 5 shows an example of a control apparatus 30, for example to be integrated with, coupled to and/or otherwise arranged for controlling at least one of the cells of FIG. 3. The control apparatus 30 can be arranged to provide control on communications in the area of a single cell or a plurality of cells. The control apparatus 30 can be configured to provide control functions in association with measurements and reporting by communication devices in one or more cells in accordance with certain embodiments described below. For this purpose the control apparatus comprises at least one memory 31, at least one data processing unit 32, 33 and an input/output interface 34. Via the interface the control apparatus can be coupled to a receiver and a transmitter of at least base station. The control apparatus can be configured to execute an appropriate software code to provide the control functions. It shall be appreciated that similar component can be provided in a control apparatus provided elsewhere in the system for controlling reception of sufficient information for decoding of received information blocks.

In LTE Release 11 zero power CSI-RS were introduced in order to allow CSI measurements in neighbour cells. The zero power CSI-RS provide in effect measurements "holes" for stations in the neighbour cells, as they allow for measurements in a cell in corresponding locations to the zero power CSI-RS in the neighbour cells. In this disclosure such measurement holes are referred to as CSI Interference Measurement Resources (IMR). LTE release 11 defines that the specific CSI interference measurement resources are for interference measurement in the downlink. These can be used in addition to CSI-RS and a UE may measure the interference also from the IMRs. The basic principle of IMRs is shown in FIG. 6.

In accordance with an embodiment CSI measurements are also enabled during UL subframes by providing such 'holes' in the UL subframe types. Such holes are referred herein to as UL IMR. UL IMRs can be characterized as sets of unoccupied UL resource elements. A UE does not transmit signals on the configured UL IMRs. Instead, physical uplink shared channel (PUSCH), if any, is punctured, or PUSCH is mapped around the UL IMRs on the given PRB.

A general level example of operation of a communication device for measurements and reporting is shown in FIG. 7. The device can determine at 40 based e.g. on the information received from network that at least one uplink resource element shall be left unoccupied. and leave at least one uplink resource element of a radio frame unoccupied accordingly. The communication device then performs at 42 at least one interference measurement on at least one downlink resource element that coincides partially with the at least one unoccupied uplink resource element. A channel state information report can then be generated and sent to the network at 46 based on the measurement.

The determination of uplink resource element to be left unoccupied can be based on signalling from the network. For example, a communication device can receive uplink IMR signalling configuration from for example from an eNB. The configuration can be received together with DL IMR and other CSI reporting configuration information.

FIG. 8 illustrates a method taking place at a network element, for example an eNB or another access network controller. This method for channel state information reporting action is taken at 50 so that a communication device is caused to leave at least one uplink resource element of a radio frame unoccupied. A channel state information report is then received at 52, the report being generated based on at least one interference measurement by the communication device on at least one downlink resource element coinciding with the at least one unoccupied uplink resource element.

The following discusses more detailed examples for CSI reporting procedures and mechanisms that are believed to better suit measurements and reporting in association with flexible Time Division Duplexing (TDD). The following focuses in particular on enhanced arrangements and uses of measurement resources for DL channel and interference measurements for flexible UL/DL subframe CSI reporting in relation to a LTE-Advanced system, for example in scenarios that may be applied to 3GPP LTE Release 12 and later versions.

More specifically, Time Division Duplexing (TDD) systems supporting flexible UL-DL subframe configurations are considered where flexible TDD UL-DL reconfiguration for traffic adaptation may be enabled, and enhancements to CSI (Channel State Information) reporting to support dynamic UL-DL configuration switching may be provided. This may be especially the case in small cells. CSI measurements, reporting, and related configuration and signalling aspects are provided to enable CSI reporting in cases when UL-DL configurations are switched dynamically.

In accordance with an embodiment appropriate uplink interference measurement resources (UL IMR) are defined and UE behaviour is determined accordingly. UL IMRs are to be used in the flexible TDD subframe in addition to the DL interference measurement resources. More detailed examples of such resources and use thereof are given below. UL IMRs can be used to enable CSI measurements for those UEs that are not transmitting UL signals in a flexible TDD UL subframe. In accordance with an aspect a UE measures and estimates the channel from serving eNB based on CSI-RS from a fixed DL subframe while interference is measured from a flexible subframe for CSI reporting. That is, interference and channel can be measured from different subframes.

Depending on the signalling scenario and the UL-DL configuration mechanism a UE may not know whether the flexible subframe is a DL or an UL subframe. In that case a possibility is to align UL IMR substantially with DL IMR so that there is no need for the UE performing CSI measurements to know whether the flexible subframe is used for UL or DL communication. Thus, in accordance with an embodiment DL and UL IMRs are aligned, i.e. same resource elements (REs) are kept empty in the DL and UL.

Alignment of the 'holes' in the UL sub-frames with those in the DL sub-frames enables good opportunities for the measurements. However precise alignment may not always be possible. This can be so for example where the DL uses Orthogonal Frequency Division Multiple Access (OFDMA) and the UL uses single carrier Frequency Division Multiple Access (SC-FDMA).

Thus, in another embodiment the DL IMR consists of a subset of UL IMRs. That is, there are more empty UL resources (i.e. IMRs) than empty DL resources. This can be used if it is not easy to fully align DL and UL resources e.g. due to different properties of LTE DL and UL waveforms and/or due to different placing of sub-carriers in respect to carrier. This may also be used to facilitate the case where the DL IMR definition is kept the same in later version of the relevant standard. An example of this embodiment is illustrated in FIG. 9. In this example the UL IMR is shown in the left to extend homogenously over the entire bandwidth and therefore necessarily aligns with the relevant DL resource elements. Resource elements are shown on the right for a DL RE grid for eight PRBs. DL IRMs are denoted by 90 and UL IMRS occupying 3 SC-FDMA symbols are denoted by 92. Timing is shown from UE perspective. There is an offset 94 between the UL and DL timings (due to timing advanced procedure)

In another embodiment illustrated on FIG. 10, DL IMR and UL IMR resource sets overlap only partially. Some of the DL IMR 90 is contained in subsets of UL IMRs 96 but only "locally". Thus, contrary to DL IMR, UL IMR does not extend homogeneously over the full bandwidth but is restricted to UL IMR "chunks" 96 in the frequency domain. Between UL IMR "chunks", there are resources (e.g. PRBs) not containing any UL IMR. The DL and UL IMR sets 90, 96 are only partially overlapping, and the UE can use UL IMR information to determine which DL IMR resources can be used for interference measurements in flexible subframes possibly containing UL transmission from the own cell. This can result in lower UL overhead than in the embodiment where the UL resource elements extended over the entire bandwidth. Timing is shown from UE perspective. There is an offset 94 between the UL and DL timings in TDD due to timing advanced procedure and ½ subcarrier offset 95 between DL and UL resource element grids.

In accordance with a specific form of the partial overlapping UL IMR is composed of complete PRBs. In LTE this means twelve subcarriers in frequency and 1 ms in time.

Turning now to a possible operation at a UE. For CSI reporting, the UE can measure the channel from the CSI-RS from a fixed subframe and interference from a flexible subframe. There are various possibilities for the UE behaviour, and some of these will now be explained with reference to the partial bandwidth embodiment shown in FIG. 11. Depending on the scenario, the UE may proceed with the measurements and reporting as follows:

- If a subframe is a fixed DL subframe, the UE measures channel from CSI-RS as usual.
- If a flexible subframe is a DL subframe and the UE knows this, the UE measures interference from DL IMR. The UE measures the channel from CSI-RS in the fixed DL subframe.
- If a flexible subframe is an UL subframe in the cell but the UE does not transmit in the UL, or UE does not know whether the flexible subframe is a DL or an UL subframe, the UE measures interference from DL resources that it determines based on the UL IMRs, for example the UE measures interference from DL IMR REs that are contained within the UL IMR regions or REs.
- If a flexible subframe is an UL subframe and the UE transmits in the UL, no interference measurement takes place. In this case signals on the configured UL IMRs are not transmitted in the UL. Instead, PUSCH and any other UL signals (if any) are punctured according to the UL IMR configuration, or they are mapped around the UL IMRs on the given PRB. Thus, even if a given UE transmits something in the UL in one subframe and thus cannot receive anything in the DL in that subframe, there may be other UEs in the cell that are not transmitting in the UL and are able to perform measurements based on DL IMRs. To enable this UL IMRs should be kept empty even if no measurement is made by the given UE. If the UE is supposed to measure periodic CSI, the corresponding report is either dropped, or a predetermined value is sent (e.g. "Out-Of-Range"), or the UL subframe is excluded from the CSI calculation. The latter can be done e.g. in case the CSI is calculated based on multiple flexible subframes based on e.g. averaging.

In embodiments where DL and UL IMRs are aligned, or DL IMR is a subset of UL IMR the UE can measure interference from DL IMR on flexible subframes, unless UE transmits in the UL. In this case no interference measurement takes place. The UE can carry out channel measurements and puncture its UL transmissions around UL IMR.

In the case where UL IMR is composed of complete PRBs, puncturing of UL transmission may also take place as above. One alternative of UL IMR sub-frame structure is to use empty UL subframes for interference measurements. It can be left to eNB scheduler to ensure that no UL transmissions take place on the configured UL IMRs. In that case, UL IMR does not necessarily impact UE behaviour for UL transmissions at all. In this alternative, configured UL IMR may be seen as a pattern in frequency and/or time domain with PRB granularity. UE uses this UL IMR pattern to mask DL IMR when UE carries out interference measurement in a flexible subframe. This subframe can be an UL subframe in the cell but the UE does not transmit in the UL. It is also possible that the UE does not know whether the flexible subframe is a DL or an UL subframe.

A possible UE procedure for embodiment where partially overlapping resource sets are provided is depicted in FIG. 11. At step S1 system configuration parameters are received. The UE can receive system configuration parameter(s) indicating at least the flexible subframes e.g. by broadcast of dedicated higher layer signalling.

Additionally, the UE may receive indications whether each flexible subframe is a DL or and UL subframe in the relevant radio frame. This depends on the signalling solution, and it shall be appreciated that the UE may not always know whether a given flexible subframe is a DL or an UL subframe.

At S2 at least one CSI reporting set configuration for flexible subframes is received. Thus at least one separate CSI reporting set configuration is made available for flexible subframes. In accordance with one embodiment, a separate CSI reporting set is provided for each subframe of the flexible subframes. There can be another CSI reporting set defined for DL subframes. In this context, flexible subframes may correspond to only those subframes that can be switched from UL (according to SIB-1 configuration) to DL subframes. In other words, from CSI reporting point of view special subframes that can be switched from S (according to the SIB-1 configuration) to DL subframes (but not to UL subframes) may be considered as fixed subframes. This reporting set may be based on usage of existing DL (D) and Special (S) subframes. In this context, flexible subframes may correspond to only those subframes that can be switched from UL (according to the SIB-1 configuration) to DL subframes. In other words, from CSI reporting point of view special subframes that can be switched from S (according to the SIB-1 configuration) to DL subframes (but not to UL subframes) may be considered as fixed subframes.

The CSI reporting set indicates when and how to report CSI (including the UL resources used to convey the CSI). The reporting may utilize fixed UL subframes, at least with periodic reporting. Also, an indication is given when to measure CSI. This indication can provide channel measurement instances and tentative interference measurement instances. The UE can determine these from the set at step S3.

The tentative interference measurement elements or instances are then converted into actual measurement instances. These are called reference resources in the 3GPP terminology. An instance element can be a subframe containing tentative measurement resource elements/IMRs This may be done continuously for each tentative CSI measurement instance, such as a subframe. To provide this the first task is to determine the subframe type at the UE side, Step S4.

In a case when CSI measurement instance relates to a subframe that can be classified as a fixed DL subframe this can be considered as a channel measurement instance. In this case channel is measured at step 5 on CSI-RS resources and the interference is measured from the related DL IMR.

In a case when CSI measurement instance relates to a flexible DL subframe, this can be considered as actual interference measurement instance. In this case interference is measured from DL IMR, see Step S6.

In a case when CSI measurement instance relates to a flexible UL subframe, the UE can determine whether it has received UL grant for that subframe, see Step S7. If UE has not received a relevant UL grant, the UE proceeds to Step S8. If the UE has received the UL grant, i.e., the UE transmits on the subframe and no interference measurement takes place. Additionally, UL is not used to transmit signals on the configured UL IMRs. Instead, PUSCH and any other UL signals (if any) are punctured according to the UL IMR configuration, or they are mapped around the UL IMRs on the given PRB pair at Step S9.

In case of UL IMRs being composed of full PRBs, step S9 may not be provided. This can be so because if UL IMR consists of a full PRB, the eNB can simply avoid scheduling that PRB to the UE and the UE does not need to do puncturing on its own.

In a case when CSI measurement instance relates to flexible UL subframe without own UL transmission or to flexible subframe for which the UE does not know link direction, this is considered as actual interference measurement instance. In this case interference is measured from DL resources based on information of the UL IMR, see Step S8.

After completing the channel measurements at Step 65 and interference measurements, either at step S5, S6 or S8, the UE can determine CSI report based on measurements and transmit it to network. If Step S9 occurred, and no interference measurements took place, the report is either dropped, or a predetermined value is sent, or the particular UL subframe is excluded from the CSI calculations.

Configuration of separate CSI reporting sets (periodic/aperiodic) can be done via dedicated higher layer signalling. For example, Radio Resource Control (RRC) signalling.

Considering LTE release 12 and upwards, DL IMR configuration can be kept the same as in release 11. If needed, specific DL IMR configurations may be introduced.

UL IMR patterns which are valid only for flexible subframes can be designed to have same periodicities as DL IMR patterns. Contrary to DL IMR, UL IMR can be composed of resource element "chunks" in certain embodiments where UL IMR are not equally spaced over the full bandwidth. Each UL IMR "chunk" can contain a considerably larger number of continuous resource elements than DL IMR. For example, UL IMR "chunk" can be a single carrier frequency division multiple access (SC-FDMA) symbol or two consecutive SC-FDMA symbols with width of a PRB or a couple of PRBs.

A UE can determine DL resources for interference measurement by masking DL IMR with UL IMR, and by using DL timing and frequency in the interference measurements. A rather large number of continuous resource elements in UL IMR chunks can be used to help to achieve a sufficient mitigation of non-orthogonal interference from own cell UL transmissions by other UEs.

It is noted that the specific UL interference situation can change from subframe to subframe. Hence, only an average interference value over a sufficient number of PRBs may be extracted from flexible subframe interference measurements to be used in CSI report determination. However, aligning the measurement resources with DL IMR resources (CSI-RS resources in interfering cells) can be used to avoid unnecessary variations on DL originated interference component and should improve interference measurement quality.

Deriving tentative CSI measurement instances/reference resources for periodic CSI reporting can include explicit indication of the tentative CSI measurement instances, e.g. subframes. The indication can include information such as periodicity and subframe offset. Alternatively, the UE may determine tentative CSI measurement instances implicitly based on available parameters such as CSI reporting configuration, UL/DL configuration defined by the SIB-1, reference UL and DL configurations, other control signalling indicating the present UL/DL configuration and/or link direction of individual subframe, CSI-RS and IMR configurations, and the minimum delay between the measurement and the reporting instances. The minimum delay can be e.g. 4 subframes. The CSI measurement to be reported in subframe n is done in the most recent flexible subframe m satisfying the condition $m \leq n-4$.

For aperiodic CSI reporting tentative CSI measurement instances can be derived from an aperiodic CSI trigger included in UL and/or DL grant. The CSI measurement may be performed in the same DL subframe as where the aperiodic CSI reporting is received. In addition to an aperiodic CSI trigger, the UE may determine tentative CSI measurement instances implicitly based on the available parameters. Examples of these are listed above.

Although the above concentrates on describing as an example the introduction of the UL IMR structure as part the TDD flexible UL-DL subframe configuration feature for LTE Release 12, this is not the only possibility. Also, although one of the seven UL/DL configurations that are broadcast in the cell was assumed as the basis for reconfiguration on a radio-frame basis (10 sub-frames), this example shall not be construed as excluding any other configurations. Also, the disclosed principles shall equally apply to fixed UL-DL subframe configurations.

The examples may provide various advantages. A generic framework is provided to extend CSI reporting to support also flexible UL/DL reconfiguration. CSI reports may be enabled to reflect actual interference conditions at the UE side in the case flexible UL/DL is in use. It can be possible to detect cross-link interference problem at the UE side. The commonality with existing CSI reporting schemes that are defined for slow and coordinated reconfiguration of UL-DL configuration can be utilised. Different signaling options available for conveying the UL/DL configuration from base station to a communication device may be supported.

It is noted that whilst embodiments have been described in relation to elements and terminology of LTE and LTE-A, similar principles can be applied to any other communication system or indeed to further developments with LTE. Also, instead of transmission by fixed base stations transmissions may be provided by a non-stationary device such as a mobile station. For example, this may be the case in application where no fixed equipment provided but a communication system is provided by means of a plurality of user equipment, for example in adhoc networks or other mobile stations that can act as a base or relay station. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method comprising:
receiving signaling indicating at least a configuration for uplink interference measurement resources and a configuration for downlink interference measurement resources, wherein the configurations are for measuring channel state information in at least one flexible subframe of a radio frame, and wherein the at least one flexible subframe is dynamically set by a network to be one of a downlink subframe and an uplink subframe,
determining, based at least on the configurations, that at least one uplink resource element of the radio frame is not to be used for transmitting signals, wherein the at least one uplink resource element is part of the at least one flexible subframe of the radio frame,
performing at least one interference measurement on the at least one uplink resource element,
generating a channel state information report based on the measurement, and
transmitting the channel state information report to the network.

2. The method of claim 1, further comprising:
measuring channel state information from a fixed downlink subframe of the radio frame from a serving enhanced NodeB signal and interference from the at least one uplink resource element.

3. The method of claim 1, further comprising:
determining downlink measurement elements of the downlink interference measurement resources for interference measurements at least partially based on the uplink interference measurement resources.

4. The method of claim 1, wherein the at least one uplink resource element without signal transmission comprises at least one uplink interference measurement resource element.

5. The method of to claim 1, further comprising:
determining, based on the received signaling, that the type of a subframe subject to a measurement is a flexible subframe with unknown direction, wherein the received signaling is indicative of tentative measurement resource elements; and
considering the tentative measurement resource elements as at least one uplink interference measurement resource element and performing the at least one interference measurement on the at least one uplink interference measurement resource element.

6. The method of claim 1, further comprising:
determining, based on the received signaling, that the type of a subframe subject to a measurement is a flexible uplink subframe, wherein the received signaling is indicative of tentative measurement resource elements; and
determining whether an uplink grant is received for the subframe,
wherein in response to determining that the grant is received, not performing an interference measurement on the subframe, and
wherein in response to determining that the uplink grant is not received, considering the tentative measurement resource element as at least one interference measurement resource element and performing the at least one interference measurement on the at least one uplink interference measurement resource.

7. A method comprising:
transmitting signaling to a communication device indicating at least a configuration for uplink interference measurement resources and a configuration for downlink interference measurement resources, wherein the configurations are for measuring channel state information in at least one flexible subframe of a radio frame, and wherein the at least one flexible subframe is dynamically set to one of a downlink subframe and an uplink subframe,
causing the communication device not to transmit signals on at least one uplink resource element of the radio frame based on the configurations, wherein the at least one uplink resource element is part of the at least one flexible subframe of the radio frame, and
receiving, from the communication device, a channel state information report based on at least one interference measurement on the at least one uplink resource element.

8. The method of claim 7, further comprising: at least one of:
puncturing a physical uplink shared channel based at least on the configuration for the uplink interference measurement resources; and
mapping the physical uplink shared channel around the at least one uplink resource element.

9. The method of claim 7, wherein resource elements corresponding to the downlink interference measurement resources are aligned with resource elements of the uplink interference measurements resources for measurement by causing no signals to be transmitted on corresponding downlink and uplink resource elements for the at least one flexible subframe of the radio frame.

10. The method of claim 7, wherein more resource elements in the uplink interference measurement resources are without signal transmission than resource elements in the downlink interference measurement resources.

11. The method of claim 10, wherein the resource elements in the uplink interference measurement resources without signal transmission are provided continuously over the full bandwidth.

12. The method of claim 7, wherein the uplink interference measurement resources comprise resource elements without signal transmission over sections of the bandwidth.

13. The method of claim 7, further comprising: scheduling uplink transmissions of the communication device such that the uplink transmissions do not coincide with the at least the uplink interference measurement resources.

14. An apparatus comprising:
at least one processor; and
at least one memory including computer program code, wherein the at least one memory and the computer program code are configured, with the at least one processor, to cause the communication device to:
receive signaling indicating at least a configuration for uplink interference measurement resources and a configuration for downlink interference measurement resources, wherein the configurations are for measuring channel state information in at least one flexible subframe of a radio frame, and wherein the at least one flexible subframe is dynamically set by a network to be one of a downlink subframe and an uplink subframe;
not use at least one uplink resource element of the radio frame for transmitting signals based at least on the configuration, wherein the at least one uplink resource element is part of the at least one flexible subframe of the radio frame;
perform at least one interference measurement on the at least one uplink resource element;
generate a channel state information report based on the measurements; and
transmit the channel state information report to the network.

15. The apparatus of claim 14, wherein the at least one memory and the computer program code are configured, with the at least one processor, to further cause the apparatus to:
determine, based on the received signaling, that the type of a subframe subject to a measurement is a flexible subframe with unknown direction, wherein the received signaling is indicative of tentative measurement resource elements, and in response thereto to consider the tentative measurement resource elements to be useable as at least one uplink interference measurement resource element and to perform at least one interference measurement on the at least one uplink interference measurement resource element.

16. The apparatus of claim 14, wherein the at least one memory and the computer program code are configured, with the at least one processor, to further cause the apparatus to:
determine, based on the received signaling, that the type of a subframe subject to a measurement is a flexible subframe and whether an uplink grant is received for the subframe, wherein the received signaling is indicative of tentative measurement resource elements, and
in response to determining that the uplink grant is received, not performing an interference measurement on the subframe, and
in response to determining that the uplink grant is not received, consider the tentative measurement resource element as at least one interference measurement resource element and perform the at least one interference measurement on the at least one uplink interference measurement resource.

17. An apparatus comprising:
at least one processor; and
at least one memory including computer program code, wherein the at least one memory and the computer program code are configured, with the at least one processor, to cause the apparatus at least to:
transmit signaling to a communication device indicating at least a configuration for uplink interference measurement resources and a configuration for downlink interference measurement resources, wherein the configurations are for measuring channel state information in at least one flexible subframe of a radio frame, and wherein the at least one flexible subframe is dynamically set to one of a downlink subframe and an uplink subframe;
cause the communication device to not use at least one uplink resource element of a radio frame for transmitting signals based at least on the configurations, wherein the at least one uplink resource element is part of the at least one flexible subframe of the radio frame; and
handle a channel state information report based on at least one interference measurement on the at least one uplink resource element.

18. The apparatus of claim 17, wherein the at least one memory and the computer program code are configured, with the at least one processor, to cause the apparatus to at least one of:
puncture a physical uplink shared channel based at least on the configuration for the uplink interference measurement resources; and
map a physical uplink shared channel around the at least one uplink resource element.

19. The apparatus of claim 17, wherein resource elements corresponding to the downlink interference measurement resources are aligned with resource elements of the uplink interference measurement resources within subframes for measurement, wherein the alignment is provided by at least one of:
causing no signals to be transmitted on corresponding downlink and uplink resource elements,
providing more resource elements without signal transmission in the uplink than in the downlink,
providing uplink resource elements without signal transmission continuously over the full bandwidth,
providing uplink resource elements without signal transmission over sections of the bandwidth,
determining downlink measurement elements for interference measurements at least partially based on information of uplink resource elements without signal transmission, and
scheduling uplink transmissions of the communication device such that uplink transmission do not coincide with uplink resource elements without signal transmission.

20. A communication device comprising the apparatus of claim 14.

21. A network node comprising the apparatus of claim 17.

22. A non-transitory computer readable comprising computer program code stored thereon, which when executed by an apparatus causes the apparatus to perform a method according to claim 1.

* * * * *